United States Patent
Chang et al.

(10) Patent No.: US 6,849,687 B2
(45) Date of Patent: Feb. 1, 2005

(54) THERMOPLASTIC COMPOSITION HAVING LOW GLOSS APPEARANCE

(75) Inventors: Moh-Ching Oliver Chang, Wexford, PA (US); Allen R. Padwa, Wochester, MA (US); Norma I. Santiago, Amherst, MA (US)

(73) Assignee: Bayer Polymers LLC, Pittsburgh, PA (US)

(*) Notice: Subject to any disclaimer, the term of this patent is extended or adjusted under 35 U.S.C. 154(b) by 181 days.

(21) Appl. No.: 10/209,778

(22) Filed: Aug. 1, 2002

(65) Prior Publication Data

US 2004/0024122 A1 Feb. 5, 2004

(51) Int. Cl.⁷ .............................................. C08L 13/00
(52) U.S. Cl. ............................ 525/64; 525/65; 525/66; 525/69; 525/70; 525/80; 525/85; 525/87
(58) Field of Search .............................. 525/64, 65, 66, 525/69, 70, 80, 85, 87

(56) References Cited

U.S. PATENT DOCUMENTS

| | | | |
|---|---|---|---|
| 4,460,742 A | 7/1984 | Kishida et al. | ............... 525/64 |
| 4,870,131 A | 9/1989 | Pisipati et al. | ................. 825/74 |
| 4,894,416 A | 1/1990 | Gallucci | ....................... 525/74 |
| 5,580,924 A | 12/1996 | Wildi et al. | .................... 525/65 |
| 6,111,015 A | 8/2000 | Eldin et al. | .................... 525/65 |
| 6,395,828 B1 * | 5/2002 | Chang et al. | .................. 525/65 |

FOREIGN PATENT DOCUMENTS

WO 94/24210 10/1994

* cited by examiner

*Primary Examiner*—Jeffrey Mullis
(74) *Attorney, Agent, or Firm*—Joseph C. Gil; Aron Preis

(57) ABSTRACT

A thermoplastic molding composition comprising a grafted acrylate rubber (ASA) and a gloss reducing agent and a process for making the same are disclosed. The gloss reducing agent is the reaction product of (i) an epoxidized grafted rubber having two or more epoxy groups in its graft phase and (ii) a compound having two or more terminal primary amine groups per molecule The gloss reducing agent may be either incorporated in ASA as the reaction product of (i) and (ii) or, in the alternative, formed upon the reaction of (i) with (ii) in the course of the thermal processing of the a blend containing ASA, (i) and (ii).

24 Claims, No Drawings

THERMOPLASTIC COMPOSITION HAVING LOW GLOSS APPEARANCE

FIELD OF THE INVENTION

This invention relates to thermoplastic molding compositions and more particularly to a blend containing an acrylate-styrene-acrylonitrile interpolymer (ASA resin) and a gloss reducing agent.

SUMMARY OF THE INVENTION

A thermoplastic molding composition comprising a grafted acrylate rubber (ASA) and a gloss reducing agent and a process for making the same are disclosed. The gloss reducing agent is the reaction product of (i) an epoxidized grafted rubber having two or more epoxy groups in its graft phase and (ii) a compound having two or more terminal primary amine groups per molecule The gloss reducing agent may be either incorporated in ASA as the reaction product of (i) and (ii) or, in the alternative, formed upon the reaction of (i) with (ii) in the course of the thermal processing of the a blend containing ASA, (i) and (ii).

DESCRIPTION OF THE PRIOR ART

Products prepared of thermoplastic molding compositions are often times glossy, yet for some applications this is not a desirable property. There is considerable need for low-gloss compositions especially in applications such as computer housings, keyboards, appliances and automotive parts.

Elimination of gloss by surface embossing has been practiced but requires a separate step and adds cost. Moreover, subsequent abrasion may remove the embossed matte surface and cause the gloss to reappear. Addition of a finely-divided filler, such as silica, silicate or aluminate or other similarly inert minerals has been demonstrated to reduce the gloss of thermoplastic molding compositions, yet, this is often accompanied by an undesirable reduction in the level of at least some physical and/or mechanical properties of the molded article, most notably the impact strength. In addition to the adverse effect on the impact strength, there is often a corresponding decline of the heat distortion temperature, decline in the weld line strength, deficient weathering and light stability, as well as other important properties.

U.S. Pat. No. 4,460,742 disclosed a delustered thermoplastic resin composition containing a thermoplastic resin, such as acrylic resin, and a component that contains the crosslinked polymerization product of a $C_{1-4}$ alkyl methacrylate and a copolymer of aromatic vinyl and $C_{1-3}$-alkyl acrylate.

U.S. Pat. No. 4,894,416 disclosed a low gloss thermoplastic blend with good physical properties that contains a core-shell ASA (acrylate-styrene-acrylonitrile interpolymer) resin blended with a polymer of glycidyl (meth)acrylate. U.S. Pat. No. 5,580,924 disclosed reduced gloss thermoplastic compositions entailing compounding a styrene-acrylonitrile copolymer (SAN) in the presence of an electrophilic reagent and an acid to form a gel, and then compounding the resultant gels with polycarbonate, SAN and ABS graft polymer to form an PC/ABS/SAN composition having reduced gloss.

Acrylonitrile-styrene-acrylate interpolymers (hereinafter referred to as ASA resins) are well known in the art, and have many favorable features such as good strength and outstanding weathering resistance. Attempts to reduce the high gloss of these resins met with the disadvantages that were discussed above. It is, therefore, desired to reduce the gloss of ASA resins while at the same time retaining the level of their mechanical properties.

DETAILED DESCRIPTION OF THE INVENTION

The composition of the invention comprises a blend of:
(a) 35 to 99, preferably 45 to 97, most preferably 55 to 95% of an ASA resin; and
(b) 1 to 65, preferably 3 to 55, most preferably 5 to 45% of the gloss-reducing agent, the percents being relative to the weight of the blend.

It has been found that such composition provides substantial reduction in gloss while retaining desirable physical properties such as impact strength, tensile strength as well as good thermal properties.

Component (a), the ASA resin (acrylate-styrene-acrylonitrile interpolymer), is known as an impact-modified, substantially-thermoplastic resin which comprises a SAN matrix in which is dispersed a grafted acrylate elastomer phase as impact modifier. The ASA component of the inventive composition contains no epoxy groups in its grafted phase. Advantageous ASA resins which are commercially available comprise a crosslinked (meth)acrylate elastomer, a crosslinked SAN copolymer and a substantially linear SAN copolymer. Methylated styrene such as α-methyl styrene or vinyltoluene may be used in place of all or part of the styrene.

The ASA resins may be prepared by a variety of known methods involving emulsion or bulk polymerization. The preferred resins of the ASA type are of core-shell structure; these structures are well known in the art and have been more fully disclosed in U.S. Pat. No. 3,944,631 that is incorporated herein by reference. The (meth)acrylate elastomer core portion of these resins may be composed of alkyl, aryl, or arylalkyl esters of acrylic or methacrylic acids. The core-shell portion of the resin may be prepared by a two-step process in which the (meth)acrylate elastomer core (which is often slightly crosslinked with polyfunctional vinyl compounds) is grafted with a thermoplastic shell of poly (methyl methacrylate), polystyrene, styrene-acrylonitrile copolymer, or similar vinyl polymers or copolymers. The core-shell structure is then blended with uncrosslinked polymer, such as poly(methyl methacrylate), polystyrene, styrene-acrylonitrile copolymer, or similar vinyl polymers or copolymers, to form ASA resin.

The most preferred ASA resins contains about 15 to about 85% of an uncrosslinked matrix of acrylonitrile-styrene copolymer polymerized and blended with a core-shell impact modifier, typically about 10 to 50% of a crosslinked (meth)acrylate elastomer core with about 5 to about 35% of a crosslinked styrene-acrylonitrile copolymer shell.

Suitable crosslinking agents include polyfunctional ethylenically unsaturated monomer, such as diallyl fumarate and diallyl maleate. The shell and core are believed to be linked by having interpenetrating molecular networks, and the term interpolymer is applied to such products having such networks.

Other ASA resins which may be advantageously used in the composition of the invention are the types disclosed in U.S. Pat. Nos. 3,655,824; 3,830,878; 3,991,009; 4,433,102; 4,442,263 and 4,409,363, all of which are incorporated herein by reference. These ASA resins have in common the use of the three monomers, namely acrylate ester, styrene (or α-methylstyrene), and acrylonitrile, to make a thermoplastic with good impact, heat distortion and weathering characteristics. They differ principally in the method of manufacture and in the detailed structure of the essential rubbery phase and the interphases if any. As a class the ASA resins have relatively similar blending properties in view of their outer continuous phase of acrylonitrile-styrene copolymer.

The gloss reducing agent of the present invention is the reaction product of (i) an epoxidized grafted rubber the structure of which includes a graft base and a graft phase, the graft base contains a rubber that is preferably selected from the group consisting of diene, acrylate and silicone rubbers; the graft phase, having a plurality of epoxy functionalities is the polymerization product of (a) at least one vinyl monomer that contains no epoxy functionalities and (b) at least one epoxy functional vinyl monomer (ii) a compound having two or more terminal primary amine groups per molecule, The gloss reducing agent may, in the alternative be incorporated in the composition as the reactants in their pre-reacted form that in the course of the thermal processing of the composition form the gloss reducing agent.

Among the suitable vinyl monomers that are free of epoxy functionalities mention may be made of ethylene, propylene, styrene, acrylonitrile, (meth)acrylic acid ester, and vinyl acetate. The suitable epoxy functional vinyl monomers include glycidyl (meth)acrylate and alkyl glycidyl ethers.

The particle size of the grafted rubber reactant is 0.05 to 20 micrometers, preferably 0.05 to 10 micrometers, most preferably 0.05 to 5 micrometers. The graft base (sometimes referred to below as rubber substrate) is grafted with polymer graft phase, where the weight ratio between the rubber substrate and the graft phase is 100:10 to 100:200, preferably 100:20 to 100:150, most preferably 100:30 to 100:100.

The preferred epoxidized graft rubber is a grafted rubber containing poly(butyl acrylate) rubber as the graft base and methyl methacrylate-glycidyl methacrylate copolymer as the graft phase. The glycidyl methacrylate is present in the grafted phase at a level of 0.5 to 5%, the percents being relative to the weight of the graft phase.

The preferred amine compound suitable as reactant in the present invention contains structural elements derived from polyolefin or polyether, and at least two terminal primary amine functional groups per molecule.

The preferred structure contains structural units derived from at least one member selected from the group consisting of polyethylene, polypropylene and polyether, and in the most preferred embodiment, the amine compound contains structural units derived from polypropylene oxide. The number average molecular weight of the suitable amine compound is 500 to 1 0000, preferably 1000 to 8000, most preferably 4000 to 6000 g/mol and the compound contains at least 2, preferably 2 to 5, most preferably 3 to 4, terminal primary amine functional groups per molecule. The most preferred amine compound is polypropylene oxide having a molecular weight of 4000 to 6000 and containing 3 terminal primary amine functional groups per molecule.

The reaction of (i) and (ii) that yields the gloss reducing agent is conventional.

The gloss reducing agent may also be incorporated in the inventive composition as the pre-reacted reactants. In this embodiment of the invention, sufficient amounts of grafted rubber and the amine compound are blended together with the ASA resin to result, under the thermoplastic processing conditions, in the formation of the gloss reducing agent of the invention.

An effective amount of the gloss reducing agent is generally in the range of 1 to 65%, preferably 3 to 55%, most preferably 5 to 45% relative to the weight of the blend of ASA and gloss reducing agent. Lesser amounts give inadequate gloss reduction, greater amounts are excessively costly and may adversely affect physical properties of the blend or molded articles made therefrom.

The inventive composition may be modified by the inclusion of additives for their art-recognized function. Such additives include fillers (exemplified by clay and talc), reinforcing agents (exemplified by glass fibers), impact modifiers, other thermoplastic resins, plasticizers, flow promoters and other processing aids, stabilizers, colorants, mold release agents, flame retardants, ultraviolet screening agents, and the like.

The preparation of the inventive composition may be carried out by blending the ASA resin with the pre-prepared reaction product or, in the alternative, with the pre-reacted reactants that react in the course of the thermoplastic processing of the composition to form the gloss reducing agent. The blending, in either embodiment of the invention may be carried out by conventional means and following procedures that are well known to the art-skilled. Blending or kneading may be carried out by machines such as a Banbury mixer or an extruder, or in the alternative by solvent blending. The sequence of addition is not critical but the components should be thoroughly blended together and under time and temperature conditions conducive for the reaction to be completed.

The invention will be better understood with reference to the following examples, which are presented for purposes of illustration rather than for limitation, and which set forth the best mode contemplated for carrying out the invention.

EXAMPLES

The properties of the exemplified compositions were determined as noted below:

MFI—refers to the melt flow index, in g/10 min. determined according to ASTM D1238, under load of 10 kg at 220° C.;

MMP—refers to the molding pressure needed for filling 99% of the mold cavity, indicated in psi and determined at 490° F.

Impact strength—refers to Izod impact strength (specimens thickness of ⅛" and ½") expressed as ft-lbs./in. was determined at room temperature (RT) and at −30° C. in accordance with ASTM D256. The samples measured 6.35 cm×1.27 cm×indicated thickness.

Tensile properties: determined at room temperature using an Instron universal machine with cross-head speed of 5 mm/minute in accordance with ASTM D-638. Type I tensile bars were used.

Gloss (at 20° and 60°) was measured at room temperature in accordance with the procedure set forth in ASTM D523 using a Gardner gloss meter on molded plaques (10.2×7.6×0.32 cm).

Flexural properties: determined at room temperature using an Instron universal machine; cross-head speed 0.05 in/minute; in accordance with ASTM D-790. The samples measured 6.35×1.27×3.18 cm.

In carrying out the following examples, the compositions were based on ASA rubber, SAN, the gloss reducing agent, and conventional additives. The conventional additives are irrelevant to the findings and are not critical to the invention.

The compounding of the compositions and the molding of test specimens were carried out following the procedures summarized below

| Compounding | |
|---|---|
| Extruder: | American Leistritz 30-mm twin-screw extruder |
| Melt Temperature: | Set at: 200 increased to 240 degree C. for Zone-1 to 10 (die) |
| Screw Speed: | 250 rpm |
| Injection Molding | |
| Molding Machine: | Engel 80-Ton |
| Melt Temperature: | Set at: 485 degree F. for Zone-1 to 4 and nozzle |
| Mold Temperature: | Set at: 150 degree F. |
| Injection Time: | 1.8 seconds* |

* Examples 5–8 also included runs where the injection time was 8 seconds, referred to in the tables as "Slow".

The ASA rubber that was used in the exemplified compositions was a blend of butyl acrylate rubbers resulting in bimodal particle size distribution of 0.4 microns and 0.15 microns. Both components of the blend included styrene-acrylonitrile copolymer grafted onto a core-shell structured rubber substrate. The core contains styrene and the shell is crosslinked poly(butyl acrylate). It is not believed that the core/shell structure is material to the findings giving rise to the present invention. The weight ratio of rubber to the grafted SAN was about 100:80; the weight ratio between the styrene and acrylonitrile in the graft phase was about 70/30.

The SAN contains 68 wt. % styrene and 32 wt. % acrylonitrile and the weight average molecular weight was 108 kg/mole.

The gloss reducing agent in the exemplified composition was the reaction product of the reactants in the indicated percentage relative to the weight of the composition (total weight of ASA resin and gloss reducing agent). The epoxidized graft rubber had poly(butyl acrylate) rubber as graft base and methyl methacrylate-glycidyl methacrylate copolymer as the graft phase. The glycidyl methacrylate was at a level of 1% relative to the weight of the graft phase. The average particle size of the epoxidized graft rubber was 0.5 micrometers. The weight percentage of the poly(butyl acrylate) in the epoxidized graft rubber was about 75%. The epoxidized graft rubber was supplied by Rohm and Haas as Paraloid EXL 2314.

The exemplified triamine compound was a primary poly(propylene oxide) triamine of approximately 5000 g/mole molecular weight.

The exemplified diamine compound was a primary poly(propylene oxide) diamine of approximately 2000 g/mole molecular weight.

The total amount of rubber in the ASA component of the inventive composition and in the epoxidized graft rubber is 40% and 39% in Examples 1–4 and 5–8, respectively, the percentage being relative to the weight of the composition (total weight of ASA resin and gloss reducing agent).

Each of the compositions in the Examples 1 to 4 contained: octadecyl-3,5-di-tert-butyl-4-hydroxy-hydrocinnamate—an antoxidant-0.3 pph; ethylene bis stearamide—a flowing aid—3.0.pph; and silicone oil—a luburicant—0.1 pph. ). Also included In each was 4.3 pph of a color concentrate containing carbon black (25% relative to the weight of the concentrate) and 75 wt % SAN copolymer (31 wt % acrylonitrile), the pph being relative to the weight of the composition (total weight of ASA resin and gloss reducing agent). Each of the compositions in the Examples 5 to 8 contained: octadecyl-3,5-di-tert-butyl-4-hydroxy-hydrocinnamate—0.1 pph; ethylene bis stearamide—1.0 pph; and silicone oil—0.1 pph), the pph being relative to the weight of the composition (total weight of ASA resin and gloss reducing agent). None of the added components is believed to have criticality in the present context.

In the tables below that summarize the results of the evaluations, the indicated amounts of ASA rubber, SAN, epoxidized graft rubber and amine compound are in percent by weight.

Example 1

| | A-0-1 | A-0-2 | A-0-3 | A-1 |
|---|---|---|---|---|
| ASA rubber | 39 | 39 | 34 | 34 |
| SAN | 61 | 60 | 61 | 60 |
| Epoxidized graft Rubber | 0 | 0 | 5 | 5 |
| Triamine | 0.0 | 0.8 | 0.0 | 0.8 |
| Diamine | 0.0 | 0.0 | 0.0 | 0.0 |
| MMP, psi | 899 | 957 | 972 | 957 |
| Impact strength (1/8" at RT) | 1.9 | 1.9 | 2.0 | 1.7 |
| Impact strength (1/8" at −30° C.) | 0.7 | 0.7 | 0.7 | 0.7 |
| Impact strength (1/4" at RT) | 1.6 | 1.6 | 1.6 | 1.7 |
| Impact strength (1/4" at −30° C.) | 0.6 | 0.7 | 0.6 | 0.7 |
| Tensile strength at yield, psi | 5405 | 5310 | 5240 | 5080 |
| Tensile strength, psi | 4745 | 4560 | 4610 | 4550 |
| Elongation, % | 83 | 77 | 80 | 90 |
| Modulus, $10^{-5}$ psi | 3.2 | 3.3 | 3.1 | 3.1 |
| Gloss (20°) | 88 | 89 | 85 | 79 |
| Gloss (60°) | 97 | 96 | 95 | 94 |

Clearly, the gloss value (20°) of the inventive composition, represented by A-1 is much reduced upon the inclusion of the gloss reducing agent of the invention. The corresponding compositions (A-0-1; A-0-2 and A-0-3) that contain no agent or but one of the reactants, exhibit higher gloss values.

Example 2

| | B-0-1 | B-0-2 | B-1 |
|---|---|---|---|
| ASA rubber | 39 | 29 | 29 |
| SAN | 61 | 61 | 59 |
| Epoxidized graft Rubber | 0 | 10 | 10 |
| Triamine | 0.0 | 0.0 | 1.5 |
| Diamine | 0.0 | 0.0 | 0.0 |
| MMP, psi | 899 | 943 | 972 |
| Impact strength (1/8" at RT) | 1.9 | 2.0 | 1.6 |
| Impact strength (1/8" at −30° C.) | 0.7 | 0.7 | 0.6 |
| Impact strength (1/4" at RT) | 1.6 | 1.6 | 1.5 |
| Impact strength (1/4" at −30° C.) | 0.6 | 0.6 | 0.7 |
| Tensile Yield, psi | 5405 | 5120 | 4830 |
| Tensile Strength, psi | 4745 | 4560 | 4320 |
| Elongation, % | 83 | 93 | 69 |
| Modulus, $10^{-5}$ psi | 3.2 | 3.1 | 3.0 |
| Gloss (20°) | 88 | 81 | 58 |
| Gloss (60°) | 97 | 94 | 88 |

Clearly, the gloss value (20°) of the inventive composition, represented by B-1 is much reduced upon the inclusion of the gloss reducing agent of the invention. The corresponding compositions (B-0-1; and B-0-2) that contain no agent or but one of the reactants, exhibit higher gloss values.

Example 3

|  | C-0-1 | C-0-2 | C-1 | C-2 |
|---|---|---|---|---|
| ASA rubber | 39 | 19 | 19 | 19 |
| SAN | 61 | 61 | 58 | 59 |
| Epoxidized graft Rubber | 0 | 20 | 20 | 20 |
| Triamine | 0.0 | 0.0 | 3.1 | 0.0 |
| Diamine | 0.0 | 0.0 | 0.0 | 1.6 |
| MMP, psi | 899 | 986 | 1015 | 1001 |
| Impact strength (1/8" at RT) | 1.9 | 1.8 | 1.5 | 1.5 |
| Impact strength (1/8" at −30° C.) | 0.7 | 0.8 | 0.6 | 0.7 |
| Impact strength (1/4" at RT) | 1.6 | 1.6 | 1.4 | 1.3 |
| Impact strength (1/4" at −30° C.) | 0.6 | 0.7 | 0.6 | 0.6 |
| Tensile strength at Yield, psi | 5405 | 4890 | 4160 | 4390 |
| Tensile strength, psi | 4745 | 4340 | 3660 | 4190 |
| Elongation, % | 83 | 87 | 48 | 90 |
| Modulus, $10^{-5}$ psi | 3.2 | 2.9 | 2.6 | 2.8 |
| Gloss (20°) | 88 | 70 | 31 | 39 |
| Gloss (60°) | 97 | 92 | 75 | 80 |

The gloss values (20°) of the inventive composition, represented by C-1 and C-2 are much reduced upon the inclusion of the gloss reducing 5 agent of the invention. The corresponding compositions (C-0-1 and C-0-2) that contain no agent or but one of the reactants, exhibit higher gloss values.

Example 4

|  | D-0-1 | D-0-2 | D-1 |
|---|---|---|---|
| ASA rubber | 39 | 9 | 9 |
| SAN | 61 | 61 | 57 |
| Epoxidized graft Rubber | 0 | 30 | 30 |
| Triamine | 0.0 | 0.0 | 4.4 |
| Diamine | 0.0 | 0.0 | 0.0 |
| MMP, psi | 899 | 1001 | 1030 |
| Impact strength (1/8" at RT) | 1.9 | 1.6 | 1.4 |
| Impact strength (1/8" at −30° C.) | 0.7 | 0.8 | 0.6 |
| Impact strength (1/4" at RT) | 1.6 | 1.5 | 1.3 |
| Impact strength (1/4" at −30° C.) | 0.6 | 0.7 | 0.6 |
| Tensile Yield, psi | 5405 | 4630 | 4435 |
| Tensile Strength, psi | 4745 | 4060 | 4218 |
| Elongation, % | 83 | 64 | 88 |
| Modulus, $10^{-5}$ psi | 3.2 | 2.8 | 2.7 |
| Gloss (20°) | 88 | 54 | 9 |
| Gloss (60°) | 97 | 88 | 46 |

The gloss value (20°) of the inventive composition, represented by D-1 is much reduced upon the inclusion of the gloss reducing agent of the invention. The corresponding compositions (D-0-1 and D-0-2) that contain no agent or but one of the reactants, exhibit higher gloss values.

Example 5

|  | E-0-1 | E-0-2 | E-1 |
|---|---|---|---|
| ASA rubber | 40 | 30 | 30 |
| SAN | 60 | 60 | 58 |
| Epoxidized graft Rubber | 0 | 10 | 10 |
| Triamine | 0.0 | 0.0 | 1.5 |
| MMP, psi | 856 | 885 | 928 |
| Impact strength (1/8" at RT) | 3.0 | 2.6 | 2.6 |
| Impact strength (1/8" at −30° C.) | 0.6 | 0.9 | 0.7 |
| Impact strength (1/4" at RT) | 2.4 | 2.1 | 1.9 |
| Impact strength (1/4" at −30° C.) | 0.7 | 0.9 | 0.7 |
| Tensile strength at Yield, psi | 5690 | 5310 | 4930 |
| Tensile strength, psi | 4670 | 4630 | 4450 |
| Elongation, % | 120 | 140 | 140 |
| Modulus, $10^{-5}$ psi | 3.1 | 2.9 | 2.7 |
| Gloss (20°) | 90 | 89 | 88 |
| Gloss (60°) | 98 | 99 | 98 |
| Gloss (20°) Slow | 89 | 87 | 57 |
| Gloss (60°) Slow | 98 | 98 | 86 |

Clearly, the gloss value (20°) of the inventive composition, represented by E-1 is much reduced upon the inclusion of the gloss reducing agent of the invention. The corresponding compositions (E-0-1 and E-0-2) that contain no agent or but one of the reactants, exhibit higher gloss values. It is well known that easier differentiation between glossy and non-glossy appearance is enabled by slower injection speeds; also at low injection speeds the gloss values are lower.

Example 6

|  | F-0-1 | F-0-2 | F-1 | F-2 | F-3 |
|---|---|---|---|---|---|
| ASA rubber | 40 | 20 | 20 | 20 | 20 |
| SAN | 60 | 60 | 59 | 58 | 57 |
| Epoxidized graft Rubber | 0 | 20 | 20 | 20 | 20 |
| Triamine | 0.0 | 0.0 | 1.0 | 2.0 | 3.0 |
| MMP, psi | 856 | 943 | 957 | 957 | 957 |
| Impact strength (1/8" at RT) | 3.0 | 2.2 | 1.8 | 1.6 | 1.7 |
| Impact strength (1/8" at −30° C.) | 0.6 | 0.9 | 0.8 | 0.7 | 0.7 |
| Impact strength (1/4" at RT) | 2.4 | 1.8 | 1.7 | 1.7 | 1.5 |
| Impact strength (1/4" at −30° C.) | 0.7 | 0.8 | 0.8 | 0.7 | 0.7 |
| Tensile strength at Yield, psi | 5690 | 4930 | 4620 | 4112 | 4420 |
| Tensile strength, psi | 4670 | 4420 | 4360 | 3736 | 4086 |
| Elongation, % | 120 | 160 | 130 | 65 | 99 |
| Modulus, $10^{-5}$ psi | 3.1 | 2.6 | 2.7 | 2.3 | 2.5 |
| Gloss (20°) | 90 | 90 | 81 | 64 | 61 |
| Gloss (60°) | 98 | 98 | 97 | 93 | 90 |
| Gloss (20°), Slow | 89 | 81 | 49 | 48 | 31 |
| Gloss (60°), Slow | 98 | 96 | 84 | 82 | 74 |

The gloss values (20°) of the inventive composition, represented by F-1, F-2 and F-3 are much reduced upon the inclusion of the gloss reducing agent of the invention. The corresponding compositions (F-0-1 and F-0-2) that contain no agent or but one of the reactants, exhibit higher gloss values.

Example 7

|  | G-0-1 | G-0-2 | G-1 | G-2 | G-3 |
|---|---|---|---|---|---|
| ASA rubber | 40 | 10 | 10 | 10 | 10 |
| SAN | 60 | 60 | 58 | 57 | 56 |
| Epoxidized graft Rubber | 0 | 30 | 30 | 30 | 30 |
| Triamine | 0.0 | 0.0 | 1.5 | 2.9 | 4.4 |
| MMP, psi | 856 | 957 | 986 | 1001 | 1001 |
| Impact strength (1/8" at RT) | 3.0 | 1.8 | 1.6 | 1.6 | 1.5 |

-continued

|  | G-0-1 | G-0-2 | G-1 | G-2 | G-3 |
|---|---|---|---|---|---|
| Impact strength (1/8" at −30° C.) | 0.6 | 0.9 | 0.7 | 0.7 | 0.7 |
| Impact strength (1/4" at RT) | 2.4 | 1.7 | 1.6 | 1.6 | 1.4 |
| Impact strength (1/4" at −30° C.) | 0.7 | 0.9 | 0.8 | 0.7 | 0.6 |
| Tensile strength at Yield, psi | 5690 | 4890 | 4290 | 3730 | 3530 |
| Tensile strength, psi | 4670 | 4240 | 4090 | 3570 | 3290 |
| Elongation, % | 120 | 110 | 120 | 70 | 58 |
| Modulus, $10^{-5}$ psi | 3.1 | 2.6 | 2.4 | 2.1 | 2.0 |
| Gloss (20°) | 90 | 83 | 43 | 25 | 12 |
| Gloss (60°) | 98 | 97 | 84 | 69 | 52 |
| Gloss (20°), Slow | 89 | 59 | 24 | 14 | 8 |
| Gloss (60°), Slow | 98 | 869 | 64 | 52 | 40 |

The gloss values (20°) of the inventive composition, represented by G-1, G-2 and G-3 are much reduced upon the inclusion of the gloss reducing agent of the invention. The corresponding compositions (G-0-1 and G-0-2) that contain no agent or but one of the reactants, exhibit higher gloss values.

Example 8

|  | H-0-1 | H-0-2 | H-1 | H-2 | H-3 |
|---|---|---|---|---|---|
| ASA rubber | 40 | 0 | 0 | 0 | 0 |
| SAN | 60 | 60 | 58 | 56 | 54 |
| Epoxidized graft Rubber | 0 | 40 | 40 | 40 | 40 |
| Triamine | 0.0 | 0.0 | 2.0 | 3.8 | 5.8 |
| MMP, psi | 856 | 870 | 972 | 972 | 1001 |
| Impact strength (1/8" at RT) | 3.0 | 1.9 | 1.5 | 1.4 | 1.2 |
| Impact strength (1/8" at −30° C.) | 0.6 | 1.0 | 0.8 | 0.7 | 0.6 |
| Impact strength (1/4" at RT) | 2.4 | 1.8 | 1.6 | 1.5 | 1.3 |
| Impact strength (1/4" at −30° C.) | 0.7 | 1.1 | 0.8 | 0.7 | 0.7 |
| Tensile strength at Yield, psi | 5690 | 4590 | 3690 | 3070 | 2720 |
| Tensile strength, psi | 4670 | 3900 | 3720 | 3220 | 2580 |
| Elongation, % | 120 | 100 | 92 | 66 | 27 |
| Modulus, $10^{-5}$ psi | 3.1 | 2.4 | 2.1 | 1.8 | 1.6 |
| Gloss (20°) | 90 | 85 | 15 | 7 | 5 |
| Gloss (60°) | 98 | 96 | 52 | 30 | 21 |
| Gloss (20°), Slow | 89 | 44 | 5 | 4 | 3 |
| Gloss (60°), Slow | 98 | 79 | 23 | 19 | 17 |

The gloss values (20°) of the inventive composition, represented by H-1, H-2 and H-3 are much reduced upon the inclusion of the gloss reducing agent of the invention. The corresponding compositions (H-0-1 and H-0-2) that contain no agent or but one of the reactants, exhibit higher gloss values.

Although the invention has been descried in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a blend of
    (a) 35 to 99% of an ASA resin; and (b) 1 to 65% of a gloss-reducing agent, the percents being relative to the weight of the blend, the gloss reducing agent being the reaction product of
        (i) an epoxidized grafted rubber the structure of which includes a graft base and a graft phase, the graft base containing a rubber and the graft phase containing a plurality of epoxy functionalities and being the polymerization product of (a) at least one vinyl monomer that contains no epoxy functionalities and (b) at least one epoxy functional vinyl monomer, with
        (ii) an amine compound having two or more terminal primary amine groups per molecule.

2. The thermoplastic molding composition of claim 1 wherein (a) is present in an amount of 45 to 97% and (b) is present in an amount of 3 to 55 percent.

3. The thermoplastic molding composition of claim 1 wherein (a) is present in an amount of 55 to 95% and (b) is present in an amount of 5 to 45%.

4. The thermoplastic molding composition of claim 1 wherein the rubber is a member selected from the group consisting of diene, acrylate and silicone rubbers.

5. The thermoplastic molding composition of claim 1 wherein the vinyl monomers that contain no epoxy functionalities is a member selected from the group consisting of ethylene, propylene, styrene, acrylonitrile, (meth)acrylic acid ester, and vinyl acetate.

6. The thermoplastic molding composition of claim 1 wherein the epoxy functional vinyl monomer is selected from the group consisting of glycidyl (meth)acrylate and alkyl glycidyl ether.

7. The thermoplastic molding composition of claim 1 wherein the epoxidized graft rubber has an average particle size of 0.05 to 20 micrometers.

8. The thermoplastic molding composition of claim 1 wherein the epoxidized graft rubber has an average particle size of 0.05 to 10 micrometers.

9. The thermoplastic molding composition of claim 1 wherein the epoxidized graft rubber has an average particle size of 0.05 to 5 micrometers.

10. The thermoplastic molding composition of claim 1 wherein the weight ratio between the graft base and graft phase is 100:10 to 100:200.

11. The thermoplastic molding composition of claim 1 wherein the weight ratio between the graft base and graft phase is 100:20 to 100:150.

12. The thermoplastic molding composition of claim 1 wherein the weight ratio between the graft base and graft phase is 100:30 to 100:100.

13. The thermoplastic molding composition of claim 1 wherein the epoxidized graft rubber is a grafted rubber containing poly(butyl acrylate) rubber as the graft base and methyl methacrylate-glycidyl methacrylate copolymer as the graft phase.

14. The thermoplastic molding composition of claim 13 wherein the glycidyl methacrylate is present in the grafted phase at a level of 0.5 to 5% relative to the weight of the graft phase.

15. The thermoplastic molding composition of claim 1 wherein the amine compound contains structural elements derived from polyolefin or polyether.

16. The thermoplastic molding composition of claim 1 wherein the amine compound contains structural elements derived from at least one member selected from the group consisting of polyethylene, polypropylene and polyether.

17. The thermoplastic molding composition of claim 1 wherein the amine compound contains structural units derived from polypropylene oxide.

18. The thermoplastic molding composition of claim 1 wherein the amine compound has number average molecular weight of 500 to 10000 g/mol.

19. The thermoplastic molding composition of claim 1 wherein the amine compound has number average molecular weight of 1000 to 8000 g/mol.

20. The thermoplastic molding composition of claim 1 wherein the amine compound has number average molecular weight of 4000 to 6000 g/mol.

21. The thermoplastic molding composition of claim 1 wherein the amine compound contains 2 to 5 terminal primary amine functional groups per molecule.

22. The thermoplastic molding composition of claim 1 wherein the amine compound is polypropylene oxide having a molecular weight of 4000 to 6000 and containing 3 terminal primary amine functional groups per molecule.

23. A process for preparing a low-gloss thermoplastic molding composition comprising melt blending a grafted acrylate rubber and
(i) an epoxidized grafted rubber the structure of which includes a graft base and a graft phase, the graft base contains a rubber and the graft phase contains at least two epoxy-functional groups and includes in its molecular structure elements derived from (a) at least one vinyl monomer that contains no epoxy functionalities and (b) at least one epoxy functional vinyl monomer, and
(ii) an amine compound having two or more terminal primary amine groups per molecule.

24. The position prepared by the process of claim 23.

* * * * *